United States Patent [19]

Gruenberg

[11] 4,107,609
[45] Aug. 15, 1978

[54] COMMUNICATIONS TRANSPONDER

[76] Inventor: Elliot L. Gruenberg, 6040 Boulevard East, New York, New York, N.J. 07093

[21] Appl. No.: 756,375

[22] Filed: Jan. 3, 1977

Related U.S. Application Data

[63] Continuation-in-part of Ser. No. 545,623, Jan. 30, 1975, Pat. No. 4,001,691.

[51] Int. Cl.² .............................................. H04B 7/14
[52] U.S. Cl. ................................... 325/14; 325/3; 325/8; 343/100 CS
[58] Field of Search ................... 325/1, 3, 5, 8, 11, 325/14; 343/6.8 R, 100 CS, 100 TD, 176, 178, 180

[56] References Cited

U.S. PATENT DOCUMENTS

| | | | |
|---|---|---|---|
| 3,394,374 | 7/1968 | Weiss | 343/100 TD |
| 3,636,452 | 1/1972 | Nuding | 325/14 |
| 3,696,421 | 10/1972 | Bitler | 325/14 |
| 3,754,257 | 8/1973 | Coleman | 325/14 |
| 3,757,335 | 9/1973 | Gruenberg | 343/100 CS |

Primary Examiner—Robert L. Griffin
Assistant Examiner—Jin F. Ng
Attorney, Agent, or Firm—Amster, Rothstein & Engelberg

[57] ABSTRACT

A transponder for use in a communication system for receiving and transmitting electro-magnetic signals, includes a first antenna array operative for receiving a first signal from a first direction and transmitting a second signal, a second antenna array operative for transmitting the second signal in a second direction, and a signal processor coupling the first and second antenna arrays to each other and being operative for receiving the first signal from the first antenna array, for phase shifting the first signal to the second signal, for coupling the second signal to the first antenna array to produce a first transmitted signal possessing a relative null in the radiated electro-magnetic power density distribution in the first direction, and for coupling the second signal to the second antenna array to produce the second transmitted signal possessing a relative maximum in the radiated spatial electro-magnetic power density in the second direction.

10 Claims, 17 Drawing Figures

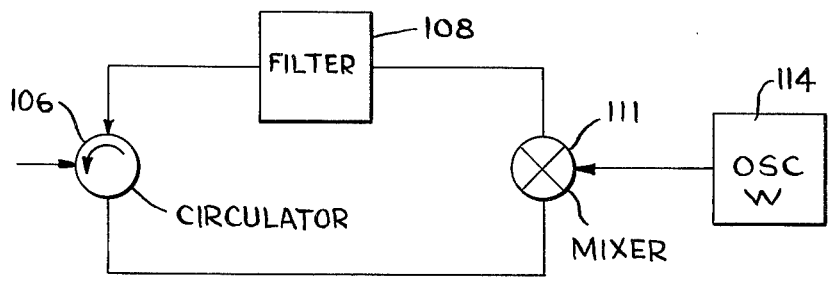
*Fig 8C*
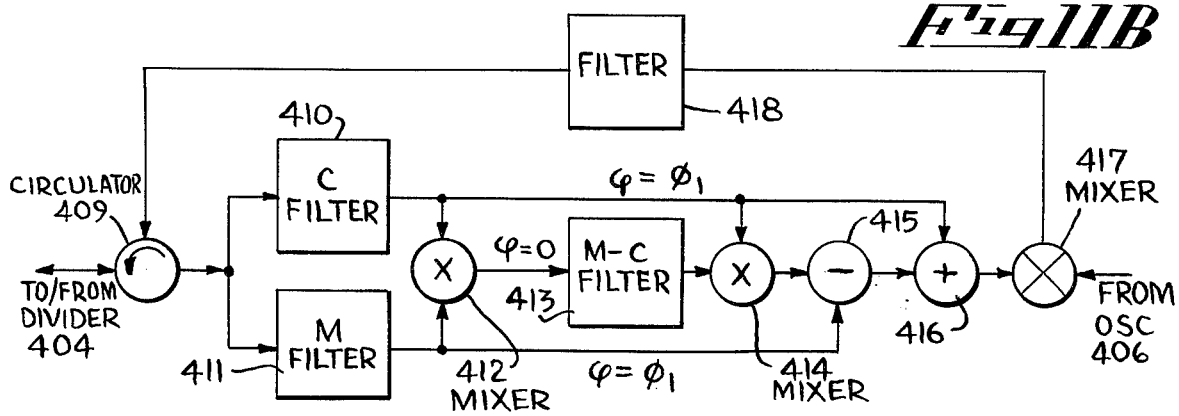
*Fig 7*
*Fig 9*
*Fig 11B*

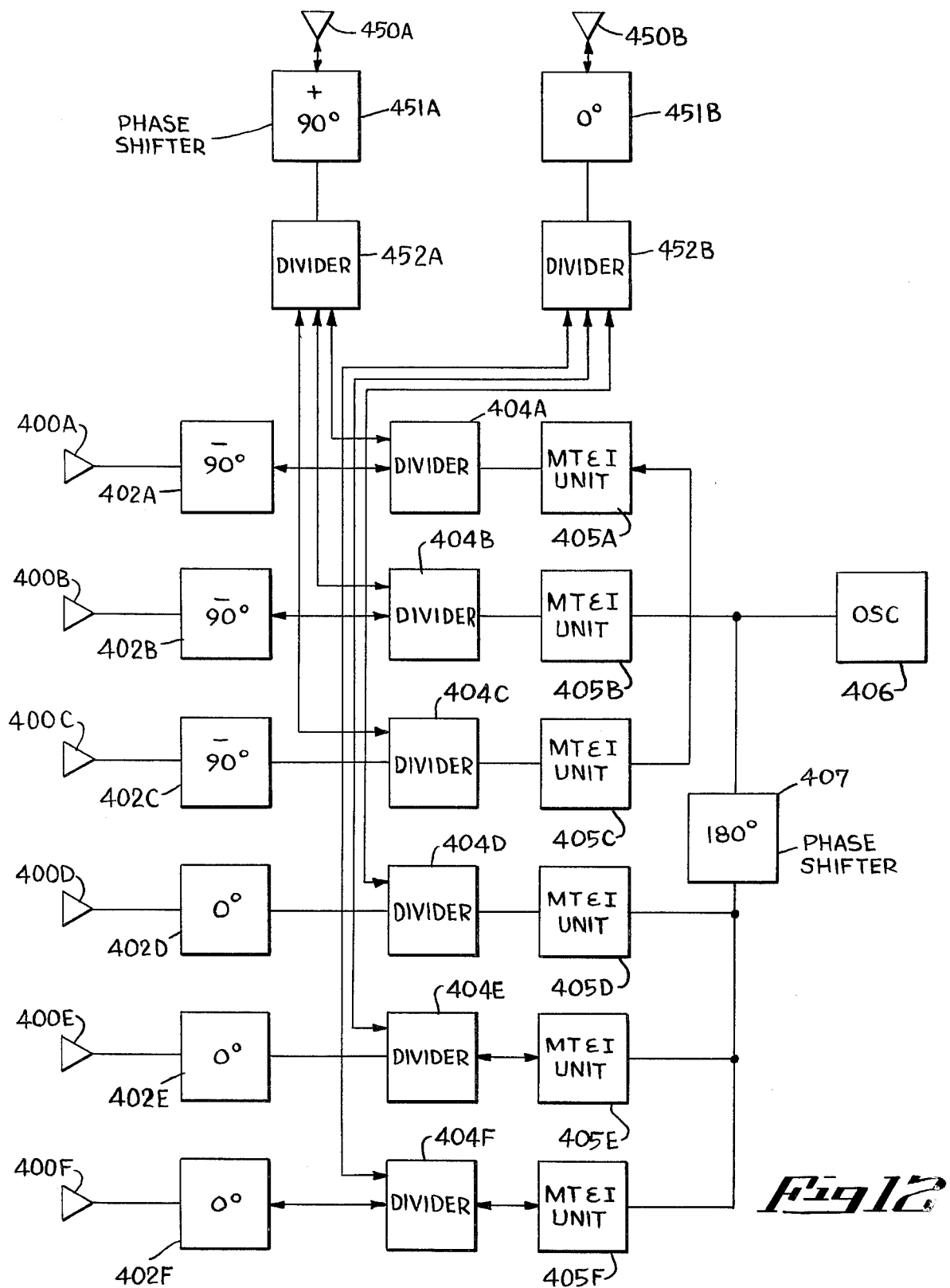

COMMUNICATIONS TRANSPONDER

REFERENCE TO RELATED APPLICATION

This is a Continuation-in-Part application of application Ser. No. 545,623, filed on Jan. 30, 1975 and issuing as Pat. No. 4,001,691.

BACKGROUND OF THE INVENTION

The invention relates to a transponder, for use in a communication system for receiving and transmitting electro-magnetic signals.

Generally, the invention is concerned with a transponder for use with at least two communication terminals and capable of relaying communications between the communication terminals optimally in order to minimize the frequency band width allocations and possible interference between the communication terminals.

It is known that two communication terminals, each having an antenna array, can be used to obtain retrodirective oscillating loops for focusing the respective antenna arrays even for noise signals. In this connection, reference is had to applicant's U.S. Pat. Nos. 3,757,335 and 4,001,691, as well as his co-authored article entitled, "Self-Directional Micro-wave Communication System", I.B.M. Journal of Research and Development, March, 1974 pages 149 to 163.

Generally, a retro-directive oscillation loop between two communication terminals features the transfer of electro-magnetic energy from one communication terminal through space to the other communication terminal, where the electro-magnetic signal is amplified and transmitted back to the first communication terminal where it is again amplified and re-transmitted and this process continues idefinitely. If the total loop gain is greater than the total loop loss, there will be a build-up signal even without the initial transmission of a carrier.

In particular, the disclosure in applicant's Pat. No. 4,001,691, issuing Jan. 4, 1977 is incorporated herein by reference.

The Abstract of the Pat. No. 4,001,691 is as follows:

In an electronic system for use in a communication system wherein there is radiated a plurality of information carrying electro-magnetic first signals each having a radiated source and each having a radiated electro-magnetic first reference signal, a transponder operable for receiving all of the electro-magnetic signals and for radiating a response thereto, a plurality of information carrying electro-magnetic second signals corresponding respectively in information to the first signals and a plurality of electro-magnetic second reference signals corresponding respectively to the first reference signals, the transponder comprising a plurality of first antenna means each having output means and each operable for receiving the first signals and the first reference signals, and for producing in response thereto a set of corresponding transmission line signals at its output means, and transmission means coupled to the output means of all of the first antenna means and operable for producing from the sets of transmission line signals a second reference signal, as well as the second signals, each of the second signals having a spatial electro-magnetic power density distribution having a peak value in the direction of each of the sources except for the source of its corresponding first signal for sources angularly spaced apart with respect to the transponder.

The main claim of the Pat. No. 4,001,691 is essentially the same as the Abstract given above and one of the dependent claims includes the limitations of at least three first antenna means, and the transmission means comprising de-phasing means coupled to the output means of one of the first antenna means and operative for producing from the set of transmission line signals from one of the first antenna means a plurality of de-phased signals corresponding, in information content respectively to the first signals, each of the de-phased signals having an electrical phase substantially independent of the position of the radiating source of its corresponding signal, and processing means and the other of the first antenna means operative for receiving the de-phased signals and the respective set of transmission line signals for producing the second signals.

Although retro-directive oscillating communication systems are of considerable interest, there is also considerable interest in a transponder capable of redirecting electro-magnetic transmissions and minimizing the band width requirements by automatically re-transmitting signals to optimize communication while minimizing electro-magnetic interference.

SUMMARY OF THE INVENTION

One of the principal objects of the invention is a transponder, for use in a communication system for receiving and transmitting electro-magnetic signals, and including first antenna means operative for receiving an electro-magnetic first signal from a first direction and transmitting an electro-magnetic second signal, second antenna means operative for transmitting the second signal in a second direction and, signal processing means coupling the first and second antenna means to each other and operative for receiving the first signal from the first antenna means, and transforming the first signal to the second signal, coupling the second signal to the first antenna means to produce a first transmitted signal possessing a relative null in the radiated electro-magnetic power density distribution in the first direction, and for coupling the second signal to the second antenna means to produce a second transmitted signal possessing a relative maximum in the radiated spatial electro-magnetic power density distribution in the second direction.

Another object of the invention is a transponder as described above wherein the second antenna means is operative for receiving an electro-magnetic third signal from a third direction and for transmitting an electro-magnetic fourth signal, the first antenna means being operative for transmitting the fourth signal in a fourth direction and the signal processing means being operative for receiving the third signal from the second antenna means, for transforming the third signal into the fourth signal, for coupling the fourth signal to the second antenna means to produce a third transmitted signal possessing a relative null in the radiated spatial electro-magnetic power density distribution in the third direction, and for coupling the fourth signal to the first antenna means to produce a fourth transmitted signal possessing a relative maximum in the radiated spatial electro-magnetic power density distribution in the fourth direction.

Another object of the instant invention is a transponder as described above, wherein the first and the third signals possess substantially the same operating frequencies and the second and the fourth signals possess substantially the same operating frequencies.

Another object of the instant invention is a transponder as described above wherein the first antenna means comprises first and second antenna elements and the second antenna means comprises third and fourth antenna elements, the processing means comprising first phase shifting means coupled to the first and second antenna elements and operative for establishing a predetermined phase shift between a first group of signals coming from or going to the first and second antenna elements and second phase shifting means coupled to the second and fourth antenna elements and operative for establishing a second predetermined phase shift between a second group of signals coming from or going to the third and fourth antenna elements, power dividing means coupled between the first and the second phase shifting means and operative for producing a first output signal which is the sum of first and second input signals thereto and operative to produce second and third output signals from a third input signal thereto.

A further object of the instant invention is a transponder for use in a communication system for receiving and transmitting electro-magnetic signals, including first antenna means operative for receiving an electro-magnetic first signal and an electro-magnetic first reference signal, second antenna means operative for receiving from a specific direction an electro-magnetic second signal and an electro-magnetic second reference signal, processing means coupling between the first and the second antenna means and operative for receiving the first signal and the first reference signal from the first antenna means, for receiving the second signal and the second reference signal from the second antenna means, for generating a third signal carrying the information content of the first signal and a third reference signal corresponding to the second reference signal, and for coupling the third signal and the third reference signal to the second antenna means to produce a transmitted signal possessing a relative maximum in the radiated spatial electro-magnetic power density distribution in the aforesaid direction.

Further objects and advantages of the invention will be set forth in part in the following specification an in part will be obvious therefrom without being specifically referred to, the same being realized and attained as pointed out in the claims hereof.

The invention accordingly comprises the features of construction, combination of elements and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which:

FIG. 7 shows a connection matrix for five communication stations;

FIGS. 8A, 8B and 8C are block diagrams for another embodiment of the instant invention;

FIG. 9 is a connection matrix for five communication stations according to the instant invention;

FIGS. 11A and 11B are block diagrams for a further embodiment of the instant invention; and FIG. 12 is a block diagram for yet another embodiment of the instant invention.

DESCRIPTION OF THE PREFERRED EMBODIMENT

In carrying the invention into effect, some of the embodiments have been selected for illustration in the accompanying drawings and description in the specification, reference being had to FIGS. 1 to 12.

Figure 1:
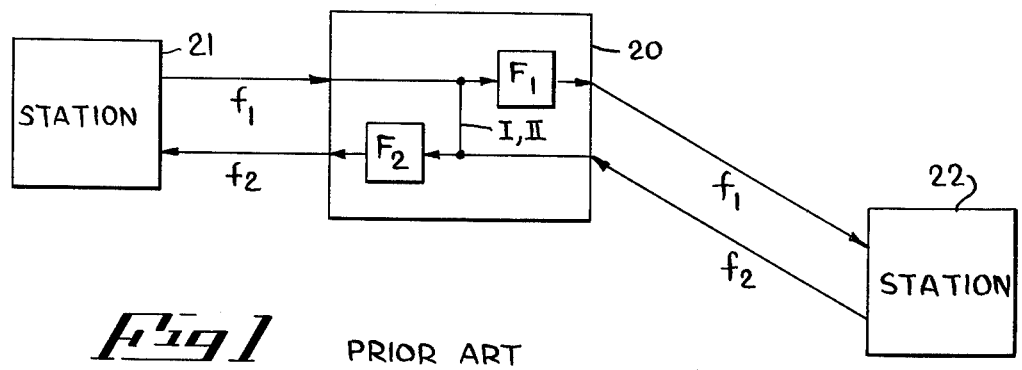
FIG. 1 shows a block diagram of a prior art communication system including a frequency changing transponder.

FIG. 1 shows a prior art communication system in which the transponder 20 receives a signal having a frequency $f_1$ from station 21 and re-transmits it at the same frequency to station 22 and also receives a signal having a frequency $f_2$ from the station 22 and transmits it at the same frequency to the station 21.

Figure 2:
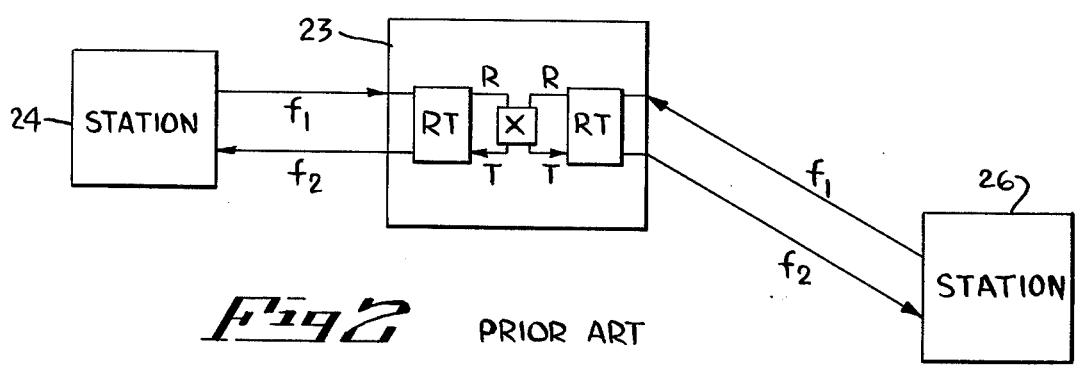
FIG. 2 shows a block diagram of a prior art communication system including a based band switching transponder.

FIG. 2 shows another prior art communication system in which a transponder 23 receives and transmits signals between the stations 24 and 26. The transponder 23 includes two separate transmitter/receivers (RD) systems and a switching system at base band frequencies.

The communication systems shown in FIGS. 1 and 2 are generally complex because of the required frequency allocations and channel assignments and because of the separate transmitter/receiver systems.

Figure 3:
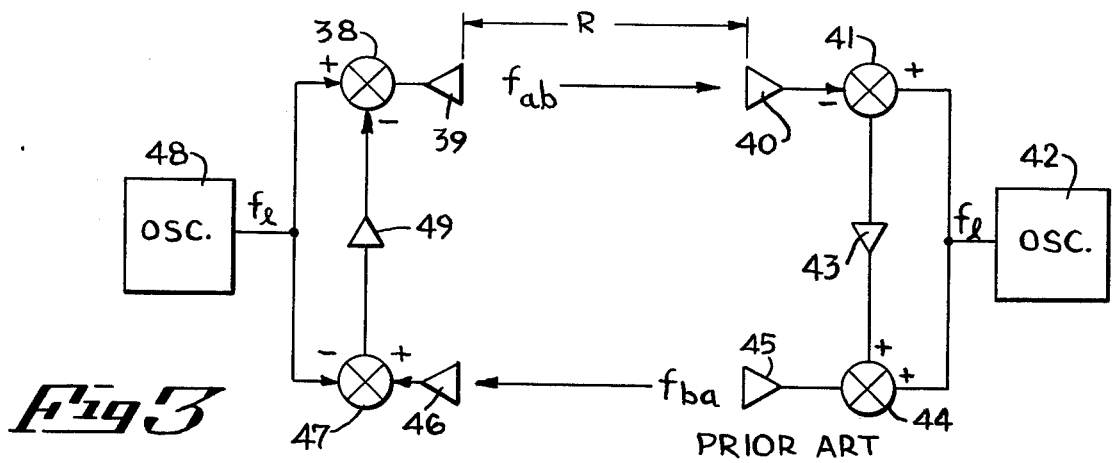
FIG. 3 shows a block diagram of a prior art communication system forming a retro-directive oscillating loop.

FIG. 3 shows a simplified so-called "singing" communication system. Generally, for this type of communication system a signal is transmitted by one communication terminal to the other communication terminal where the signal is amplified and re-transmitted and this cycle continues until the two communication terminals are focused towards each other, assuming the overall loop gain exceeds the overall loop loss and the system parameters are linear. Such a build-up of signal amplitude can even occur for radiated noise power.

The communication system shown in FIG. 3 is a simplified retro-directive closed loop communication system in which a received signal is frequency translated to an intermediate frequency for amplification and then is frequency translated back to the transmitting frequency. Signal noise produced by a mixer 38 is transmitted by an antenna element 39 and is received by an antenna element 40 and coupled with the mixer 41 where it is mixed with a signal $f_1$ generated by a local oscillator 42. The intermediate frequency output signal from the mixer 31 is coupled to an amplifier 43 and then is mixed in a mixer 41 with the signal from a local oscillator 42 to produce the signal having a frequency $f_{ba}$ which is transmitted by an antenna element 35 to an antenna element 46. The signal received by the antenna element 46 is coupled to the mixer 47 and is mixed with the signal from a local oscillator 48. The intermediate frequency signal generated by the mixer 47 is coupled to an amplifier 49 and then is mixed in the mixer 38 to generate a signal to be transmitted by the antenna element 39. The circulated signal increases in amplitude until saturation occurs in the communication system.

Figure 4A:
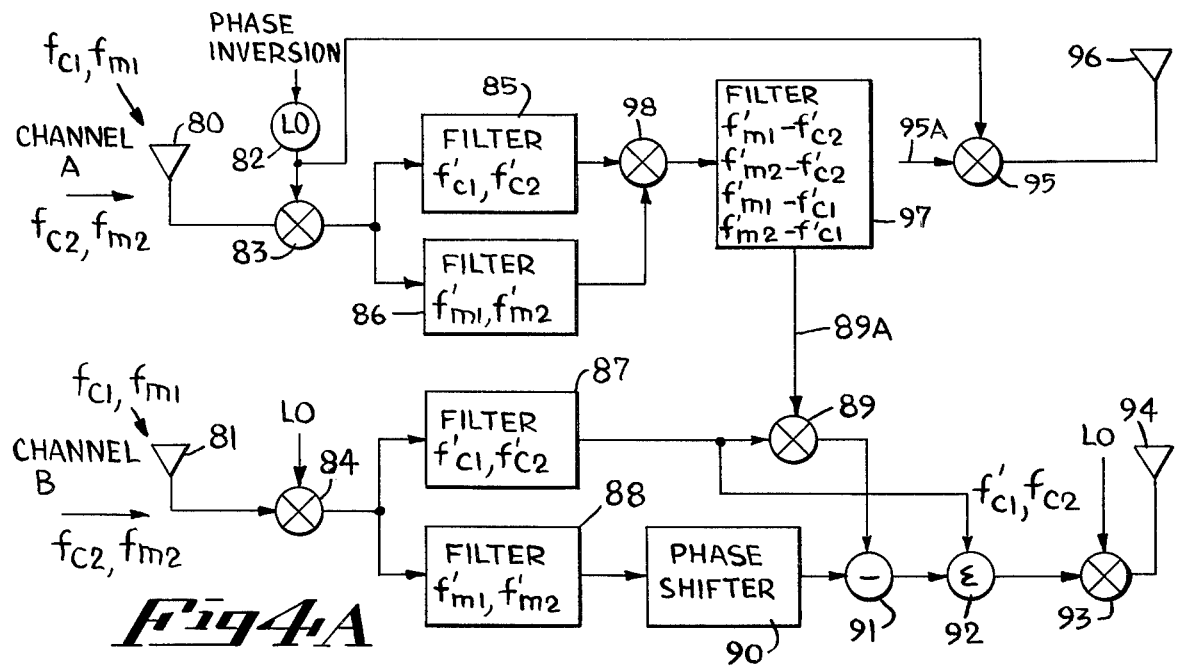
FIGS. 4A and 4B are block diagrams of a transponder according to U.S. Pat. No. 4,001,691.

FIG. 4A shows a block diagram for an echo-less transponder according to the U.S. Pat. No. 4,001,691.

Typically, one communication terminal transmits a reference carrier signal at a frequency $f_{c1}$ and modulation signal at a frequency $f_{m1}$ while another communication station radially spaced with respect to the transponder transmits a reference or carrier signal at a frequency $f_{c2}$ and a modulation signal at a frequency $f_{m2}$. The two carrier frequencies are essentially the same and the two modulation signals are within a predetermined modulation frequency band. The four signals are received by the antenna elements 80 and 81. The signals received by the antenna element 80 are coupled to a mixer 83 and mixed with local oscillator signal from a local oscillator 82 to produce intermediate frequency (IF) signals corresponding to the received signals shown in the FIG. 4A with "primes". A filter 85 selectively passes the signals at the frequency $f'_{c1}$ and $f'_{c2}$ and a filter 86 selectively passes the signals at the frequencies $f'_{m1}$ and $f'_{m2}$. The filters 85 and 86 are coupled to a mixer 98 and dephased signals $(f'_{m2} - f'_{c2})$, $(f'_{m2} - f'_{c1})$, $(f'_{m1} - f'_{c2})$, and $(f'_{m1} - f'_{c1})$ are produced and passed through a filter 97. These dephased signals are used in other channels such as channel B to generate special signals for producing the echo-less transmission.

The signals received by an antenna element 81 are coupled to mixer 84 and mixed with a signal from the local oscillator 82 to produce intermediate frequency (IF) signals such as in the channel A. A filter 87 selectively passes the signals at frequency $f'_{c1}$ and $f'_{c2}$ while a filter 88 selectively passes the signals at frequency $f'_{m1}$ and $f'_{m2}$. The filter 87 is coupled to a mixer 89 and mixed with the dephased signals from the filter 97 to produce a set of signals having the modulation of the signals of the frequency of $f_{m1}$ and $f_{m2}$ respectively but phased with respect to the antenna element 80 in accordance with the signals received by the antenna element 81. The signals from the filter 88 are coupled to a difference network 91 through a phase adjuster 90 and the output signals from the mixer 89 are also coupled to the difference network 91. The phase adjuster 90 is for compensating for electrical phase differences due to the physical path differences of the various signals. The output signals from the difference network 91 are coupled to summer 92 along with the signal output of the filter 87. The output signal 93A from summer 92 is coupled to a mixer 93 and mixed with the local oscillator signal from the local oscillator 82. A signal 95A analogous to the signal 93A but derived from the filters 85, 86, and 97 is connected to a mixer 95 and the output of the mixer 95 is coupled to an antenna element 96. The elements radiated signals, the antenna elements 94 and 96 combine in space to produce a radiation pattern having a relative null in the direction of the source of the modulation signal. The signal from the local oscillator 82 is selected to obtain a phase reversal for the signals to the antenna elements 94 and 96 in accordance with the usual practice so that a retrodirective array is obtained. Of course, it may be desirable in some cases not to have the echoless transponder to be essentially retro-directive.

Figure 4B:
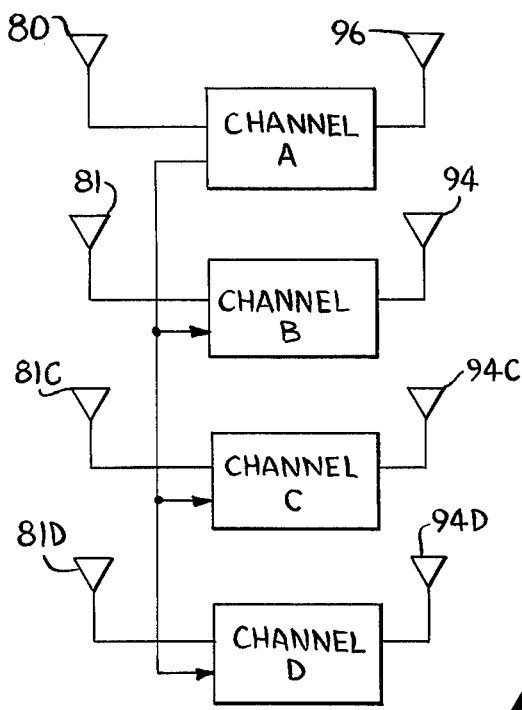

FIG. 4B shows a further embodiment of the invention shown in FIG. 4A. The corresponding elements in FIGS. 4A and 4B are identified in the same way. As indicated in the FIG. 4B, additional channels can be used to increase the array size of the antennas and thereby form a narrow receiving and/or transmitting radiation pattern. Transmission line 89A of the FIGS. 4A and 4B connects the output of the filter 97 to the mixers in channels C and D corresponding to the mixer 89 in channel B.

Figure 5:
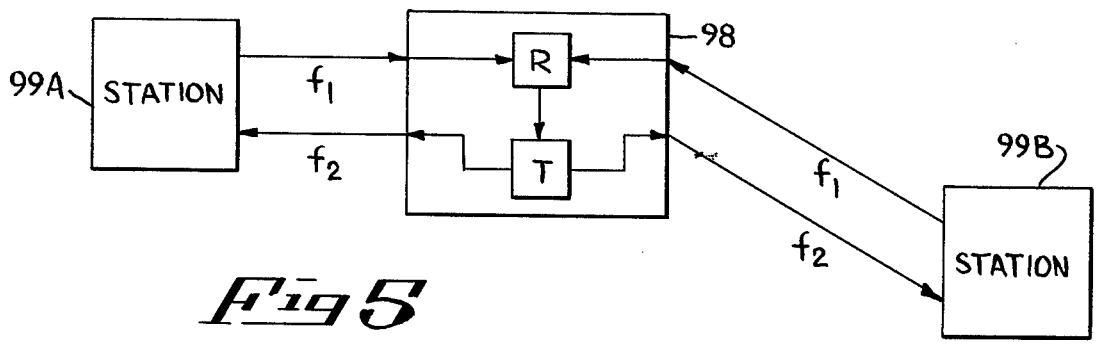
FIG. 5 is a block diagram of one embodiment of the instant invention.

FIG. 5 shows a simplified block diagram of a communication system according to the instant invention. A transponder 98 includes one receiver and one transmitter and receives signals having a frequency $f_1$ from stations 99A and 99B and transmits signals having a frequency $f_2$ to the stations 99A and 99B. Typically, the transponder 98 receives a signal in its receiving portion R and couples it over to be transmitted in its transmitting portion, but 99A intelligence signal does not return to 99A station, nor 99b intelligence to 99B station.

Figure 6:
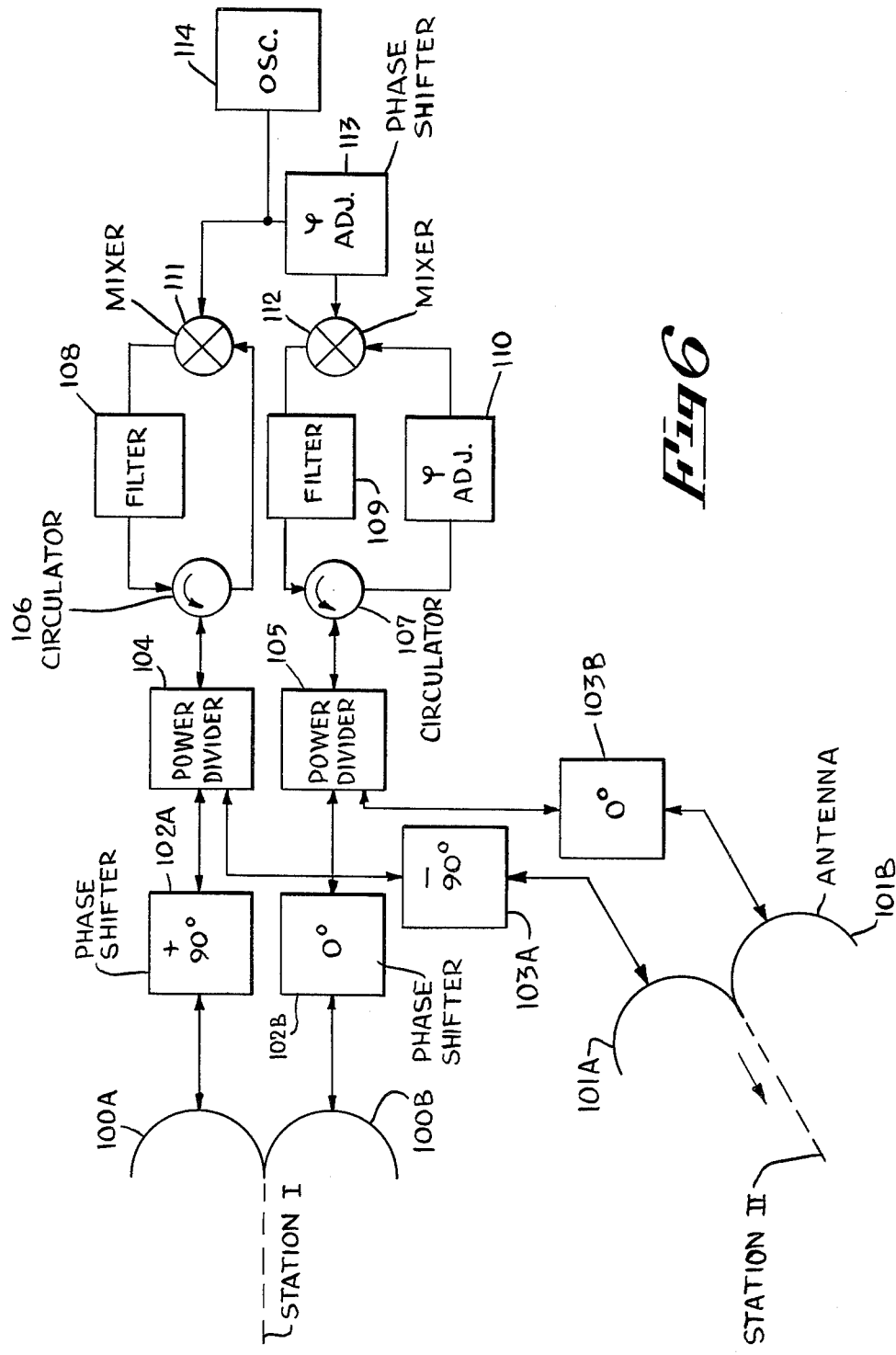
FIG. 6 shows a block diagram of the transponder shown in FIG. 5.

FIG. 6 shows a block diagram of a transponder for intercommunicating between two angularly separated stations. Antenna elements 100A and 100B form an antenna array for communicating with a Station I. Generally, the antenna elements 100A and 100B can be directional antennas of the parabolic type or some other type of directional antenna and the receiving and transmitting radiation pattern of the array should be generally directional with low side lobes.

Electro-magnetic signals from the Station I are received by the antenna elements 100A and 100B. The antenna 100A is coupled to a phase shifter 102A which introduces a +90° phase shift and is coupled to bi-directional power divider 104. Antenna elements 101A and 101B form an array in communication with a Station II. The antenna element 101A is coupled to a phase shifter 103A which introduces a 90° phase shift and which is coupled to the power divider 104. The power divider 104 is coupled to a circulator 106 and combines signals at its other terminals without mutual phase shifts to the circulator 106. The circulator 106 can be a typical circulator available commercially.

The signals coupled from the power divider 104 to the circulator 106 are then coupled to a mixer 111 and are mixed with a relatively narrow band signal from an oscillator 114.

The signals received at the antenna elements 100A, 100B and 101A and 101B generally have a radial frequency band of $w \pm w_m$, where $w$ is an approximate center frequency of the modulated signals and $\pm w_m$ represents the highest and lowest important spectral components of the modulated signal. The oscillator 114 generates a signal having a frequency $2w + w_i$ to the mixer 111. The resultant low side band signal has a frequency of $w \pm w_m + w_i$ which is coupled to a filter 108. The filter 108 introduces a 90° phase shift so that a signal such as $\cos(wt + 90°)$ becomes $\cos[(w + w_i)t - 90°]$. Such signals are coupled back through the circulator 106 to the power divider 104 and then through respective phase shifters 102A and 103A to the antenna elements 100A and 101A.

The path of a signal from the Station I is through the antenna element 100A and is then eventually transformed and transmitted by the antenna elements 100A and 101A. The signal transmitted towards the Station I possesses a relative null in the electro-magnetic power density distribution and the signal transmitted towards the Station II possesses a relative maximum in the radiated spatial electro-magnetic power density distribution. This is established by the following relationships:

In simple terms, a signal received by the antenna element 100A experiences a phase delay of +90° from the phase shifter 100A and a phase shift of −90° from the filter 108. The part of the signal returning to the antenna 100A is coupled to the phase shifter 102A and delayed by 90°, so that the signal reaching the antenna element 100A is delayed by 180°.

On the other hand, the signal coupled to the divider 104 is advanced by 90° and reaches the antenna element 101A substantially unchanged in phase.

Of course, the phase relationship between the various paths is in terms of the phase of signals in the same phase plane of the respective arrays.

This can be understood with reference to the antenna elements 100A and 101A. If, for example, the Station I is equi-distant from the antenna elements 100A and 100B, then the signals arriving at these antenna elements will be in phase with each other. The signal arriving at the antenna element 100B is coupled to the phase shifter 102B which is assumed to produce a zero phase shift. The phase shifter 102B can be assumed to be a phase shifter for compensating for differences in phases between the respective signal paths which are undetermined. The phase shifter 102B is coupled to a power divider 105 which is coupled to a circulator 107. A phase shifter 110 is provided to compensate for undesired phase differences in the system. A phase shifter 113 is adjusted to produce a 180° phase shift if the phase shifters 102A and 103A do not operate reciprocally, but provide the same phase shift in each direction, instead of a negative phase shift in the reverse direction, that is, if the phase shifters 102A and 103A are reciprocal phase shifters, then the phase shifter 113 establishes a 0° phase shift.

Signals returning to the antenna element 100A and to the antenna 100B which are originated from the Station I are 180° out of phase with respect to each other and thereby produce a null in the radiated power towards the Station I. The corresponding signals coupled to the antenna elements 101A and 101B will be in phase and thereby produce a maximum radiated signal in the direction of the Station II.

Similarly, signals transmitted from the Station II will result in a radiated signal from the antenna elements 100A and 100B possessing a maximum in the direction of the Station I, but the radiated signal from the elements 101A and 101B towards the Station II will show a null.

Generally, a circulator 106, filter 108, mixer 111, and oscillator 114 establish a signal phase inverter component. The circulator 107, filter 109, mixer 112, and oscillator 114 provide the same function.

Generally, the transponder as shown in FIG. 6 can be extended to serve more than two stations. For FIG. 6, a single frequency pair is used. If three or more stations are to be linked together, then a system of connections, that is, a connection logic must be established in order to suppress self-signals while transmitting to other stations. As all stations must receive a transmission signal, only one pair of stations can use the transponder at one time. It can be arranged to have the other stations receive a "busy" signal in such a case.

In general, the connections necessary for a communication system serving five stations is complex and FIG. 7 shows a diagram indicating in numerical order the connections necessary in order to establish communication for five stations, numbered I and II, III, IV, and V and "X" indicates that no connection is needed for communication with any station with itself. The FIG. 7 follows the well known relationship:

$$C = N[(N-1)/2]$$

where $C$ is the number of connections and $N$ is the number of stations to be interconnected two at a time.

Three stations require three connections for three independent paths through the transponder, whereas five stations require ten connecting paths.

The instant invention, as indicated in the foregoing explanation, is typical in that communications from one station to another also establishes the reverse communication so that half the connections ordinarily needed can be permitted.

Figure 8A:
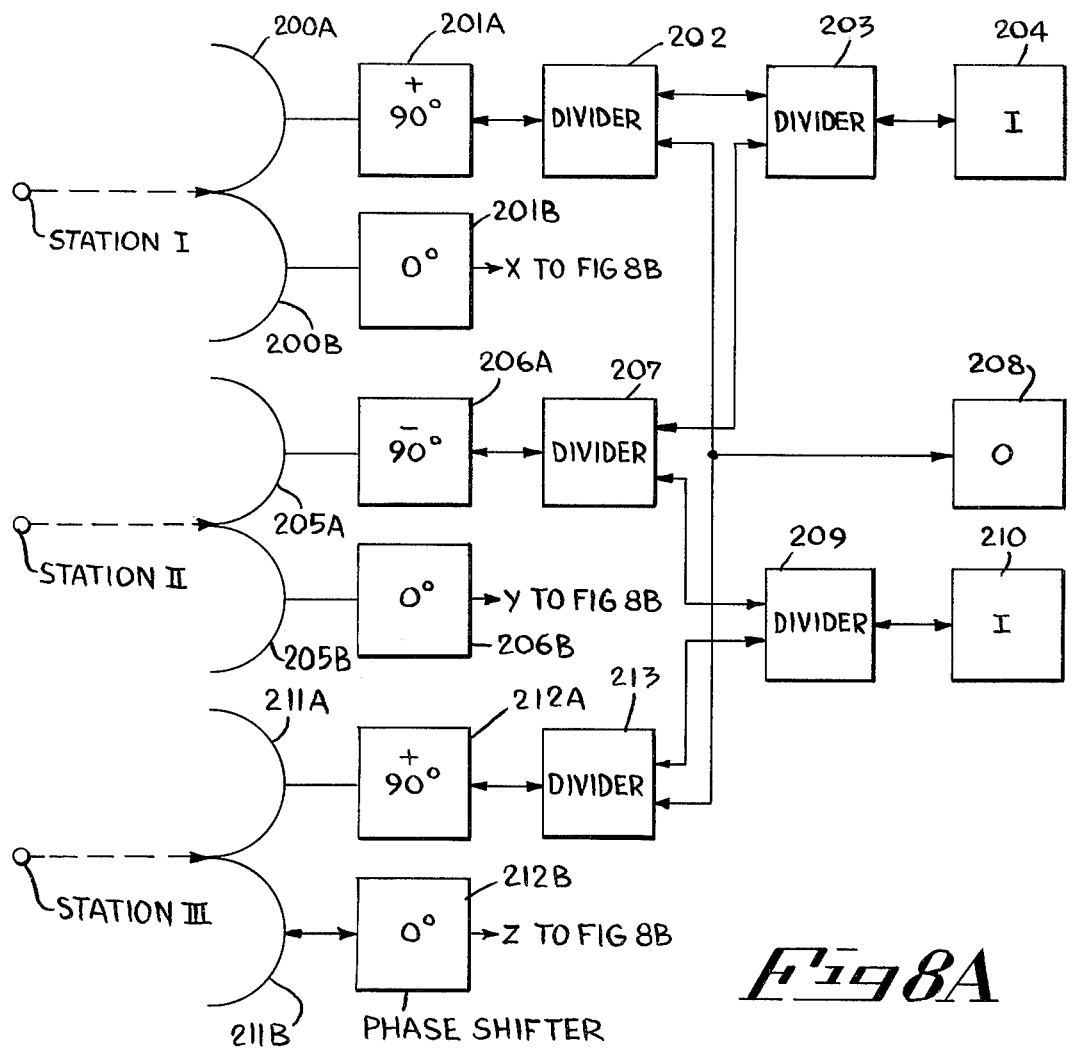
Figure 8B:
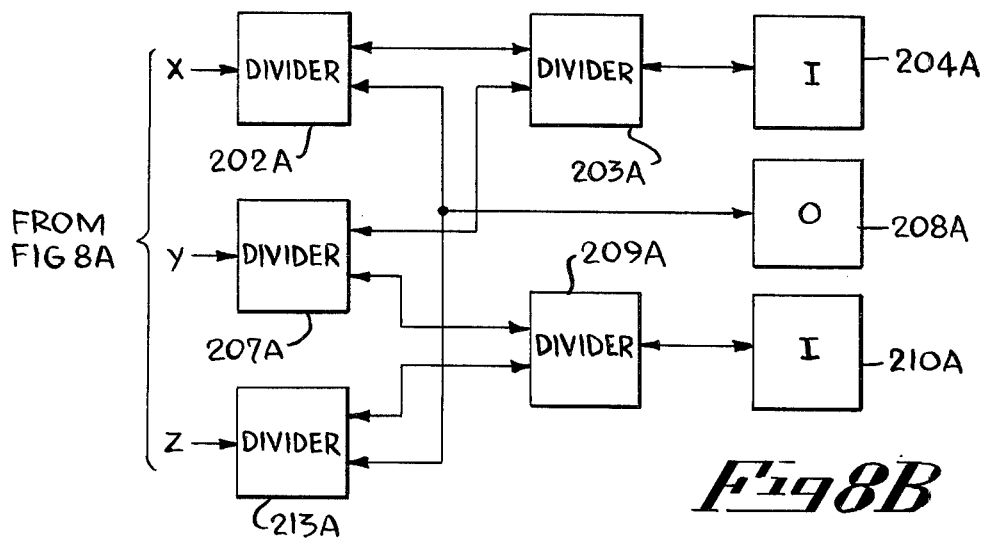

FIG. 8A is a block diagram of a three directional transponder. Antenna elements 200A, and 200B form one antenna array; antenna elements 205A and 205B form another antenna array; and antenna elements 211A and 211B form still another antenna array.

A signal from Station I is received by the antenna element 200A and is advanced in phase by 90° by phase shifter 201A and is then coupled to the bi-directional divider 202. For purposes of simplifying the disclosure, it is assumed that the divider 202 equally power divides the input signal without any phase shift and couples one of these signals to a divider 203. The divider 203 also receives the signal which has originated from Station II through a path defined by antenna element 205A, phase shifter 206A and bi-directional divider 207. The phase shifter 206A retards signals in phase by 90°.

The divider 203 is coupled to I unit 204 which inverts the phase of the signal received, offsets the frequency of these signals, and then couples back the offset, phase-inverted signal to the divider 203. The operation of the unit 204 can be carried out by the circulator 106, filter 108, mixer 111 and oscillator 114 as shown in FIG. 8C in which the oscillator frequency is twice the signal frequency plus or minus the offset frequency. Of course, the oscillator 114 can be used for multiple units.

The signal from the unit 204 is delayed by 90° and is power divided by the divider 203 into two paths, one path returning to the antenna element 200A to the divider 202 and phase shifter 201A. The phase shifter 201A can be a reciprocal type which retards the phase an additional 90° so that the phase at 200A is −180° with respect to the signal which arrives at the antenna 200A. The other path leads to the antenna element 200B with, relatively speaking, zero phase shift, but an offset in frequency. The process is similar to the first path except that the phase shift 201B provides zero phase shift. Thus, the signals transmitted towards the Station I cancel each other, that is, produce a null in the radiated spatial electro-magnetic power density distribution.

The other path through the divider 202 is coupled to the divider 207 and then to a phase shifter 206A where the signal is advanced by 90° so that the signal arriving at the antenna element 205A is shifted zero degrees with respect to the signal which entered the antenna element 200A. At the same time, a signal which enters the antenna element 200B will emerge from the antenna element 205B with a zero degree phase shift so that signals in phase are radiated towards the Station II to produce a maximum radiated spatial electro-magnetic power density distribution.

Thus, the transponder shown in FIG. 8A establishes communication between the Stations I and II as in the case of the transponder shown in the FIG. 6. Communication between the Stations II and III can be understood by tracing the signal paths of the antenna element 205A and from the antenna element 205B along with the signals at the antenna elements 211A and 211B. The phase shifter 206A produces a −90° phase shift to the signal going to the divider 207. Half of the power out of the divider 207 is coupled to a bi-directional divider 209. The I unit 210 is similar to unit 204 so that a phase shift of +90° with respect to the initial signal appears at the antenna element 205A.

There is a signal path through the divider 209 to the divider 207 and then through the phase shifter 206A where it is advanced +90° so that it arrives at the antenna element 205A at +180° out of phase with respect to the original signal as well as being at an offset frequency. The signal path through the divider 209 to a divider 213 is coupled to a phase shifter 212A where it is delayed by 90° so that the signal reaching the antenna element 211A is 0° phase shifted with respect to the directional signal arriving there and is in phase with the signal returned to the antenna element 211A. Thus, the antenna elements 211A and 211B radiate a signal which has a null in the direction of the Station III.

Signals from the Station III reach the antenna element 211A and antenna element 211B and eventually produce signals at an antenna element 205A and antenna element 205B which will be in phase and transferred to the Station II whereas the radiated signal from the antenna elements 211A and 211B will produce a null in the direction of the Station III because of the signal paths including unit 210, dividers 209 and 213, and phase shifters 211A and 212B.

The signal originated from the Station III is eventually received through the transponder and the Station I through signal paths including the antenna element 211A, phase shifter 212A, divider 213, O unit 208, divider 202, phase shifter 201A, and antenna element 200A. The O unit 208 is similar to the I unit 204 except that there is no change in the phase of signals passing through the unit and only an offset frequency is produced. The FIG. 8C shows a block diagram for unit 208. In this case, the oscillator 114 produces a lower frequency $w_i$ to the mixer 111 and the frequency $w$ and the filter 108 passes $w - w_1$, the phase shifter 212A advances the phase by 90° and the phase shifter 201A relays the phase by 90° to produce an overall phase shift of 0°.

It can be seen, that a signal from the Station I can be received by Station III while signals from the Station III can be received by the Station I, that is, any two stations can carry out two-way communications simultaneously while a third station must wait until a communication path to one of these stations is free.

The general pattern for interconnecting of multiple stations is shown by the connection logic given in FIG. 9. The symbols "I" and "O" refer to blocks shown in the FIG. 8C. Furthermore, the symbol "X" represents the absence of a connection. A comparison between the FIGS. 7 and 9 shows the improvement of the instant invention because of the reduced number of connections needed. The column and row headings indicate the value of the phase shift required for communication paths. The connection between the Stations I and II requires a path having a +90° phase shift and a −90° phase shift. This requires the use of an I unit such as unit 204 where the connection between the Stations I and III requires the use of two separate +90° phase shifts which mutually cancel and hence an O unit such as unit 208 is used. The connection between the Stations I and IV requires another I unit. The $I_1$ unit is separate from the $I_3$ unit because independent paths must be established between the Stations I and II and I and IV at the same time to cancel out the self-signals I—I, II—II, and IV—IV. Similarly, a separate connection through an $O_3$ unit is required in the Stations I and V.

Figure 10A:
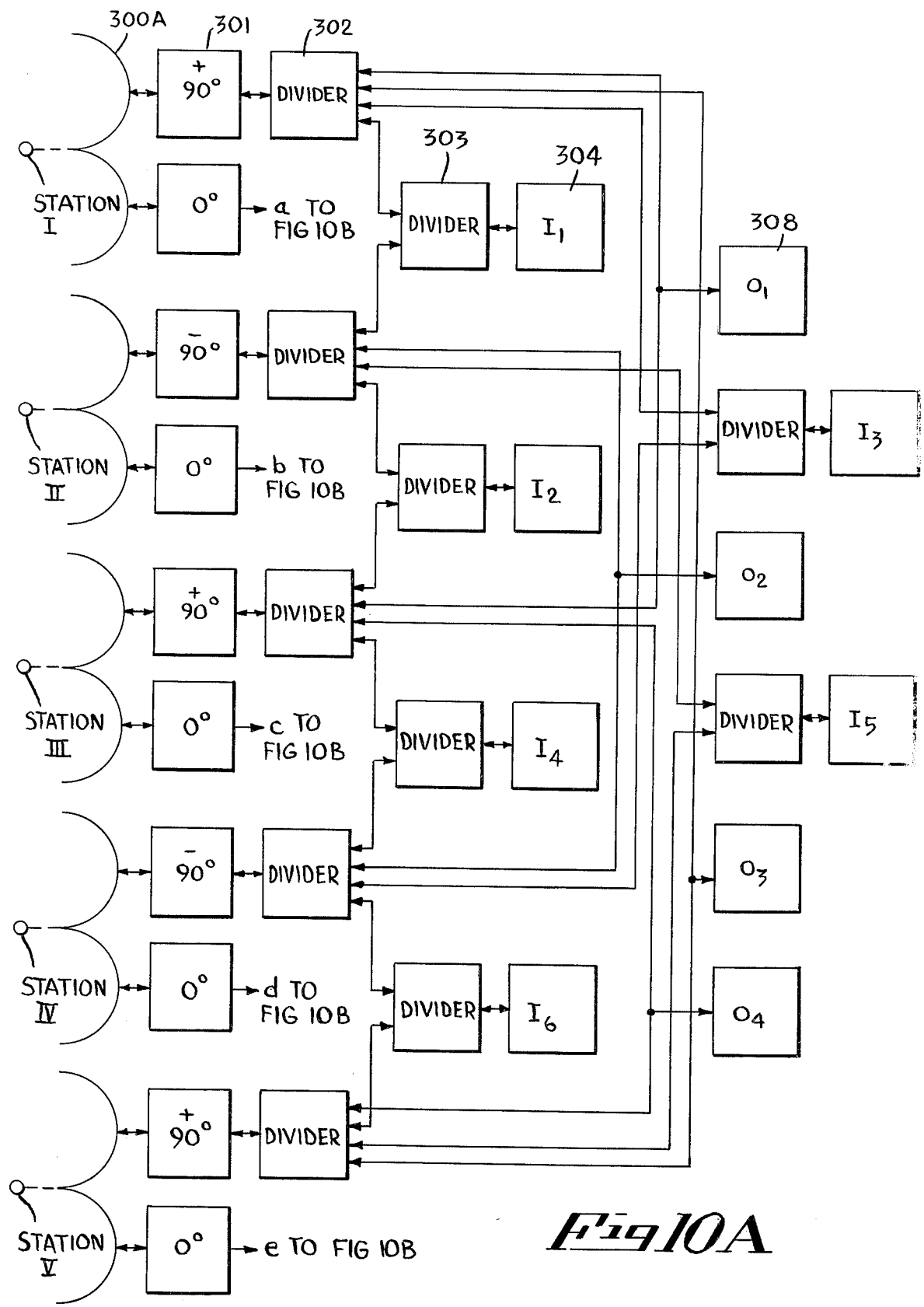
FIGS. 10A and 10B are block diagrams for yet another embodiment of the instant invention.
Figure 10B:
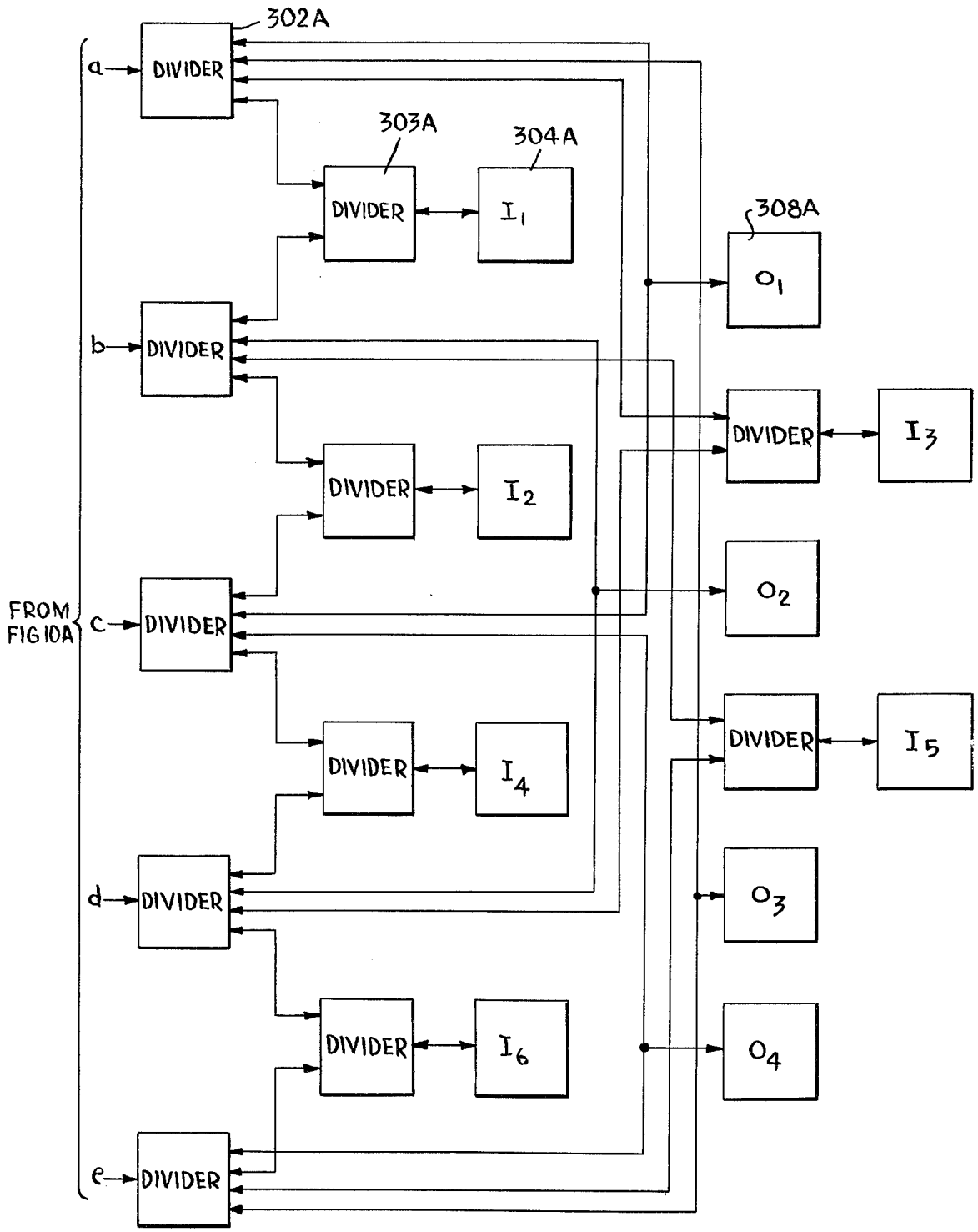

FIG. 10A and FIG. 10B show a block diagram extending the transponder shown in the FIG. 8A to five directions. Generally, the components shown in FIGS. 10A and 10B correspond to the elements in the FIGS. 8A and 8B.

Antenna element 300A corresponds to the antenna element 200A, phase shifter 301 corresponds to the phase shifter 201, divider 302 corresponds to the divider 202 except that the divider 202 is a four way divider, divider 303 corresponds to the divider 203, unit 304 corresponds to the unit 204, and unit 308 corresponds to the unit 208. The I and O units in the FIGS. 10A and 10B have subscripts to correspond to the FIG. 9.

Figure 11A:
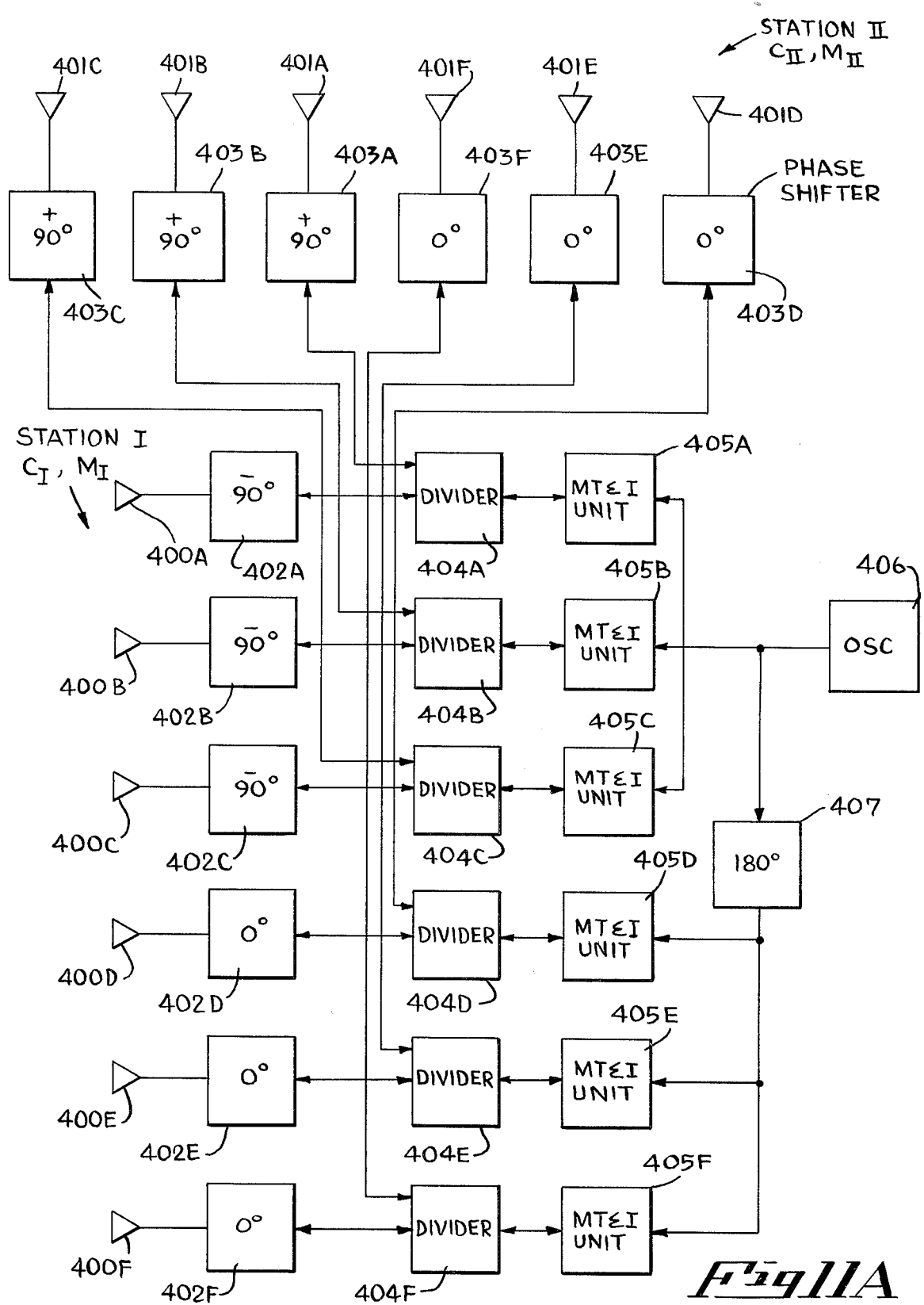

FIG. 11A shows a system for transferring the modulation between arrays for a transponder of the type disclosed in the aforementioned Pat. No. 4,001,691. Generally, that patent discloses communication systems between two stations within the field of view of an array for receiving the modulated signal from one station and using the same frequency allocation between the stations. The array usefully cancels the self-modulation. The system as shown in the FIG. 11A and FIG. 11B enables signals originating from one array from being re-radiated by the other array and allows the transfer of modulations from one array to the other array.

Generally, Station I can be located within a field of view in azimuth from about 0° to about 45° and Station II can be in a position of from about 75° to about 120°. Signals entering antenna elements 400A, 400B, 400C, 400D, 400E, and 400F are processed analogously to the signals described in connection with the FIGS. 4A and 4B described herein. The signal from the Station I includes a reference signal $C_I$ and a modulated signal $M_I$. The $C_I$ signal would ordinarily be transmitted back to the Station I but not the signal $M_I$ is the antenna 401 and other components were not present. If the antenna 401 were simply in a power connection with the antenna 400, the carrier modulation from the Station I would be radiated to a false direction in the field of view of the antenna 401. Such radiation is prevented by connecting each element of the antenna 400 to a phase shifter such as 402A having a −90° phase shift, then to a bi-directional divider such as divider 404A. The antenna elements 401A, 401B, and 401C are connected to the dividers 404A, 404B and 404C through +90° phase shifters 403A, 403B, and 403C. The dividers 404A, 404B, and 404C are connected respectively to modulation transfer and phase inverting (MT + I) units 405A, 405B, 405C. The FIG. 11B shows a typical circuit for modulation transfer and phase inverting units. A circulator 409 receives signals from filters 410 and 411 which separate the reference signals from the modulation signals. A mixer 412 mixes signals and provides a signal at a frequency M − C which is passed by filter 413, and is de-phased to produce a signal which is phase independent of the direction of arrival. If two stations sent signals, then the M − C signal would be the sum of the two signals. This signal is mixed with the reference signal in the mixer 414 and the upper side band product at frequency M is coupled to a difference unit 415. The modulation signal from any given station is delivered to the 415 unit so that it would be subtracted from the sum of the modulation signal when both signals are sent back to the source station. The carrier C is added to the other signals in the summer 416 and these are mixed in the mixer 417 with a signal from oscillator 406. If incoming signals are lower in frequency than the oscillator frequency of the oscillator 406, the phase of the different output signal of the mixer 417 will be inverted with respect to those incoming signals. A filter 418 selects the difference frequency and couples it to the circulator 409 for transmission.

Generally, the unit 405 inverts the phase of any signal coupled into it and then couples the signal to the dividers 404. Thus, a signal originating in one of the antenna elements 400 would be phase shifted − 90°, then inverted to + 90°, and then, if the phase shifter 402 is reciprocal, would be phase shifted an additional 90° for a total of 180° before returning to the antenna elements 400. Signals coupled to the dividers 404 which have a path through the phase shift 403 will arrive at the antenna elements 401 with 0° phase shift and the same relationship exists for signals entering the antenna elements 401.

Signals entering the lower half of the antenna array 400, antenna elements 400D, 400E, and 400F are each given a 180° phase shift as are the signals entering the antenna elements 401D, 401E, and 401F. This relationship arises because the phase shifters 402 and 403D, 403E, and 403F each provide a 0° phase shift while the units 404D, 405E, and 405F also provide a 0° phase shift, but the oscillator 406, which controls the phase inverting process of the units 405 is coupled to the phase shifter 407, which introduces a 180° phase shift. Thus, the signals from the units 405D, 405E, and 405F are phase shifted 180°.

As a result of the circuit arrangement, signals received by the antenna elements 400A, 400B, and 400C will eventually be coupled over to antenna elements 401A, 401B, and 401C at 180° out of phase with respect to the signals received by the antenna elements 400D, 400E, and 400F which are eventually coupled to the antenna elements 401D, 401E, and 401F. Therefore, the signals radiated by the antenna array 401 will produce a null in the radiated spatial electro-magnetic power density distribution in the corresponding false directions of the signal source.

The signals, however, that return to the antenna elements 400A, 400B, and 400C, will be in phase with the signals coupled to the antenna elements 400D, 400E, and 400F, and therefore will produce a maximum in the radiated spatial electro-magnetic power density distribution in the directions of the signal sources.

Thus, the system shown in FIGS. 11A and 11B allows the modulation transfer to take place in the units 405 while tending to cancel out radiation from the array receiving the signal and in false directions from the array transmitting the signal.

FIG. 12 is a system similar to that shown in FIG. 11A, except that the two antenna arrays do not include the same number of antenna elements. In order to compensate for this difference, dividers 452A and 452B are used for antenna elements 450A and 450B. A phase shifter 451A provides a 90° phase shift while phase shifter 451B represents a 0° phase shift.

In general, it is assumed that differences in phase lengths for various paths throughout the systems described herein can be compensated for in accordance with well known techniques such as the use of a variable phase shifter. This is possible because the operation set forth depends upon phase differences and not absolute phase values. In addition, variations in the system components such as the use of an equivalent to the bi-directional divider or reciprocal divider is possible.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A transponder, for use in a communication system for receiving and transmitting electromagnetic signals, comprising, in combination:
   first antenna means operative for receiving an electromagnetic first signal from a first direction and transmitting an electromagnetic second signal;
   second antenna means operative for transmitting said second signal in a second direction; and
   signal processing means coupling said first and said second antenna means to each other and including means for receiving said first signal from said first antenna means, means for phase shifting said first signal to said second signal, means for coupling said second signal to said first antenna means to produce said second transmitting signal, said second transmitted signal possessing a relative null in the radiated spatial electromagnetic power density distribution in said first direction, and means for coupling said second signal to said second antenna means to produce said second transmitted signal, said second transmitted signal possessing a relative maximum in the radiated spatial electromagnetic power density distribution in said second direction.

2. The transponder as claimed in claim 1, wherein said second antenna means is operative for receiving an electromagnetic third signal from a third direction and for transmitting an electromagnetic fourth signal;
   said first antenna means being operative for transmitting said fourth signal in a fourth direction; and
   said signal processing means being operative for receiving said third signal from said second antenna means, for phase shifting said third signal into said fourth signal, for coupling said fourth signal to said second antenna means to produce said fourth transmitted signal possessing a relative null in the radiated spatial electromagnetic power density distribution in said third direction, and for coupling said fourth signal to said first antenna means to produce said fourth transmitted signal possessing a relative maximum in the radiated spatial electromagnetic power density distribution in said fourth direction.

3. A transponder as claimed in claim 2, wherein said first and said fourth directions are the same.

4. The transponder as claimed in claim 2, wherein said first and said third signals possess substantially the same operating frequencies, and said second and said fourth signals possess substantially the same operating frequencies.

5. The transponder as claimed in claim 1, wherein said first antenna means comprises first and second antenna elements and said second antenna means comprises third and fourth antenna elements;
   said processing means comprising
   first phase shifting means coupled to said first and second antenna elements and operative for establishing a predetermined first phase shift between a first group of signals coming from or going to said first and second antenna elements and second phase shifting means coupled to said third and fourth antenna elements and operative for establishing a second predetermined phase shift between a second group of signals coming from or going to said third and fourth antenna elements, power dividing means coupled between said first and said second phase shifting means, first and second phase inverting means coupled to said first and second phase shifting means through said power dividing means and operative for adjusting the phase of signals received in one of said first and second antenna means and returning the adjusted signals to the same one antenna means for retransmisson with a radiation pattern having a null in the direction of the received signals and for transmitting said phase adjusted signals from the other antenna means with a maximum radiation pattern.

6. The transponder as claimed in claim 5, wherein said first and second phase shifts are substantially 90°.

7. The transponder as claimed in claim 1, further comprising at least one additional antenna means, said signal processing means coupling said additional antenna means to the remaining antenna means and being operative for producing said null radiation pattern only in the retransmission of transformed signals from the receiving antenna in the direction of received signals.

8. A transponder for use in a communication system for receiving and transmitting electromagnetic signals, comprising, in combination:
   a first antenna array operative for receiving from arbitrary directions electromagnetic information bearing first signals, and electromagnetic first reference signals;
   a second antenna array operative for receiving from a specific direction electromagnetic information bearing second signals and electromagnetic second reference signals;
   signal processing means coupled between said first and said second antenna arrays and including means for receiving and phase transforming said first information bearing signals and said first reference signals from said first antenna array, means for receiving and phase transforming said second information bearing signals and said second reference signals from said second antenna array, means for generating third signals carrying the information content of said first information bearing signals and third reference signals derived from said second reference signals, means for coupling said third signals and said third reference signals to said second antenna array to produce transmitted signals possessing a relative maximum in the radiated spatial electromagnetic power density distribution in said specific direction, means for preventing signals received in said arbitrary direction in said first antenna array from transmitting from said second antenna array by causing a null in the radiation pattern of the said second antenna array for retransmitting said information bearing signals in the directions of received reference signals, and means for preventing said information bearing signals from retransmission in the direction of their receipt.

9. The transport as claimed in claim 8, wherein said processing means comprises de-phasing means including modulation transfer and phase inversion means each operative for generating a de-phased signal corresponding to said first signal, said de-phased signal possessing an electrical phase substantially independent of the incidence angle of said first signal to said first antenna array.

10. The transponder as claimed in claim 8, wherein said first antenna array comprises a first plurality of antenna elements and said second antenna array comprises a second plurality of antenna elements, said second plurality of antenna elements being less than said first plurality of antenna elements, and power dividing means operative for combining signals compensating the difference in the number of antenna elements and being coupled to said second plurality of antenna elements and said signal processing means.

* * * * *